(12) United States Patent
Isaacson et al.

(10) Patent No.: US 7,321,972 B2
(45) Date of Patent: Jan. 22, 2008

(54) ISOLATING MULTIPLE AUTHENTICATION CHANNELS, EACH USING MULTIPLE AUTHENTICATION MODELS

(75) Inventors: Scott A. Isaacson, Woodland Hills, UT (US); Alexander Y. Danoyan, Riverton, UT (US)

(73) Assignee: Novell, Inc., Provo, UT (US)

( * ) Notice: Subject to any disclaimer, the term of this patent is extended or adjusted under 35 U.S.C. 154(b) by 716 days.

(21) Appl. No.: 10/807,945

(22) Filed: Mar. 23, 2004

(65) Prior Publication Data
US 2005/0108579 A1    May 19, 2005

Related U.S. Application Data

(63) Continuation-in-part of application No. 10/061,911, filed on Feb. 1, 2002, and a continuation-in-part of application No. 10/061,895, filed on Feb. 1, 2002.

(51) Int. Cl.
*G06F 9/00* (2006.01)

(52) U.S. Cl. ............ 713/189; 713/193; 713/194; 713/162; 713/166; 713/168

(58) Field of Classification Search ............... 713/189, 713/193, 194, 162, 166, 168
See application file for complete search history.

(56) References Cited

U.S. PATENT DOCUMENTS 5,832,211 A    11/1998    Blakley, III et al.
2003/0056096 A1    3/2003    Albert et al.

OTHER PUBLICATIONS

Wahl and Howes; "Lightweight Directory Access Protocol"; IETF Standard, Internet Engineering Task Force, CH, Dec. 1997, 51 pages.
Rescoria; "A Survey of Authentication Mechanisms"; IETF Standard-Working Draft; Internet Engineering Task Force; CH; No. 1; Jan. 2004; 38 pages.

*Primary Examiner*—Thomas R. Peeso
(74) *Attorney, Agent, or Firm*—Marger, Johnson & McCollom, P.C.

(57) ABSTRACT

A computer receives a user authentication request from a client. The computer accesses a password associated with the user name, stored locally on the computer, and attempts to authenticate the password using an authentication server. If the password authentication succeeds, the computer hashes the password and compares the hashes. If the hashes match, the user authentication succeeds.

31 Claims, 12 Drawing Sheets

ISOLATING MULTIPLE AUTHENTICATION CHANNELS, EACH USING MULTIPLE AUTHENTICATION MODELS

RELATED APPLICATION DATA

This application is a continuation-in-part of commonly-assigned U.S. patent application Ser. No. 10/061,911, titled "Authentication Cache in a Distributed Network Environment," filed Feb. 1, 2002, and is a continuation-in-part of U.S. patent application Ser. No. 10/061,895, titled "Authentication on Demand in a Distributed Network Environment," filed Feb. 1, 2002, both of which are incorporated by reference.

FIELD OF THE INVENTION

This invention pertains to network access, and more particularly to providing a way to support new hashing algorithms in authentication of a user to a network.

BACKGROUND OF THE INVENTION

The ability to access information over a network has been a boon to most users. That a user can access desired information from a remote location (possibly, even a location that the user could not locate or reach physically) has resulted in benefits to many.

But it remains important to be certain that the user accessing the resource is a legitimate user. To that end, users need to log in to the network and authenticate themselves. If they cannot identify themselves properly to the network, they are denied access to the network resources. This situation occurs when the Common Internet File System (CIFS) authentication is used, and is exemplified in the Novell Network Attached Software Appliance and Novell Branch Office products.

Originally, the server that performed authentication was the server that stored the resources of interest to the user. This situation is exemplified by FIG. 1. The user operates client or user workstation 105. Client 105 can be any type of computer system: desktop, laptop, thin client, dumb terminal, personal digital assistant (PDA), etc. Client 105 includes the appropriate components for its design. For example, if client 105 is a desktop computer, client 105 includes computer 110, monitor 115, keyboard 120, and mouse 125, as shown. The computer includes a central processing unit, memory, and other appropriate elements. Other components of client 105 can be present, such as a printer. A person skilled in the art will recognize other variations of client 105.

Figure 1:
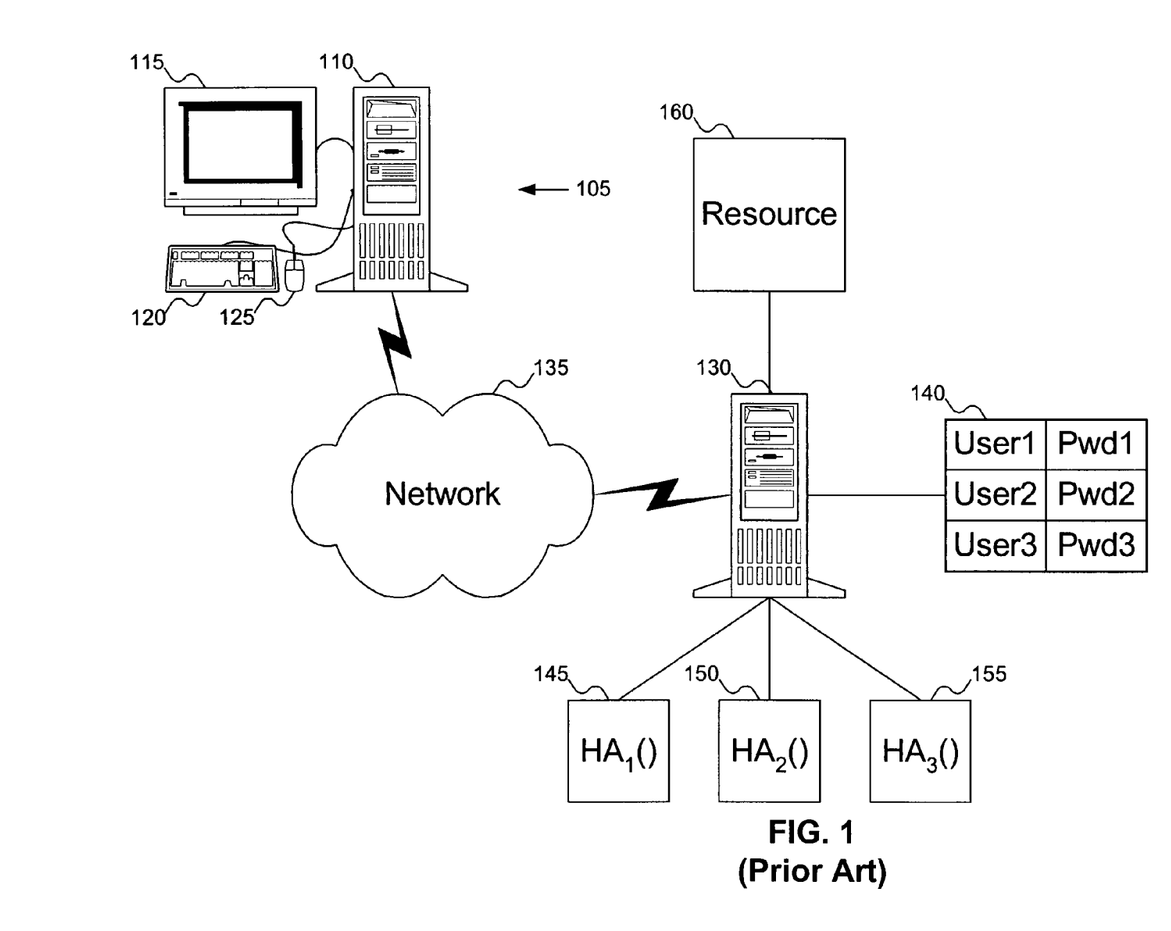
FIG. 1 shows a prior art system for authenticating a user using an application server.

Client 105 computes a hash of the user's password, by applying a hashing algorithm to the password. By hashing the user password, there is no concern that the user's password might be sent "in the clear," where it might be intercepted. Client 105 then contacts server 130 across network 135. Network 135 can be any variety of network connection between client 105 and server 130. For example, network 135 can be a direct connection between client 105 and server 130, a wired network connection (such as Ethernet or token ring), a wireless connection (such as IEEE 802.11b, IEEE 802.11a, or Bluetooth), or any other type of connection. Client computer system 105 provides the user's name and the hashed password to server 130. Server 130 looks up the user's name in user list 140 to determine the user's cleartext password. Server 130 then uses a hashing algorithm (such as hashing algorithms 145, 150, or 155) to hash the cleartext password. (Which hashing algorithm is used depends on 105 client computer system, as different computers could use different algorithms.) Server 130 then compares the hashed passwords. If they match, the user is authenticated, and is then granted access to resources, such as resource 160.

Figure 2:
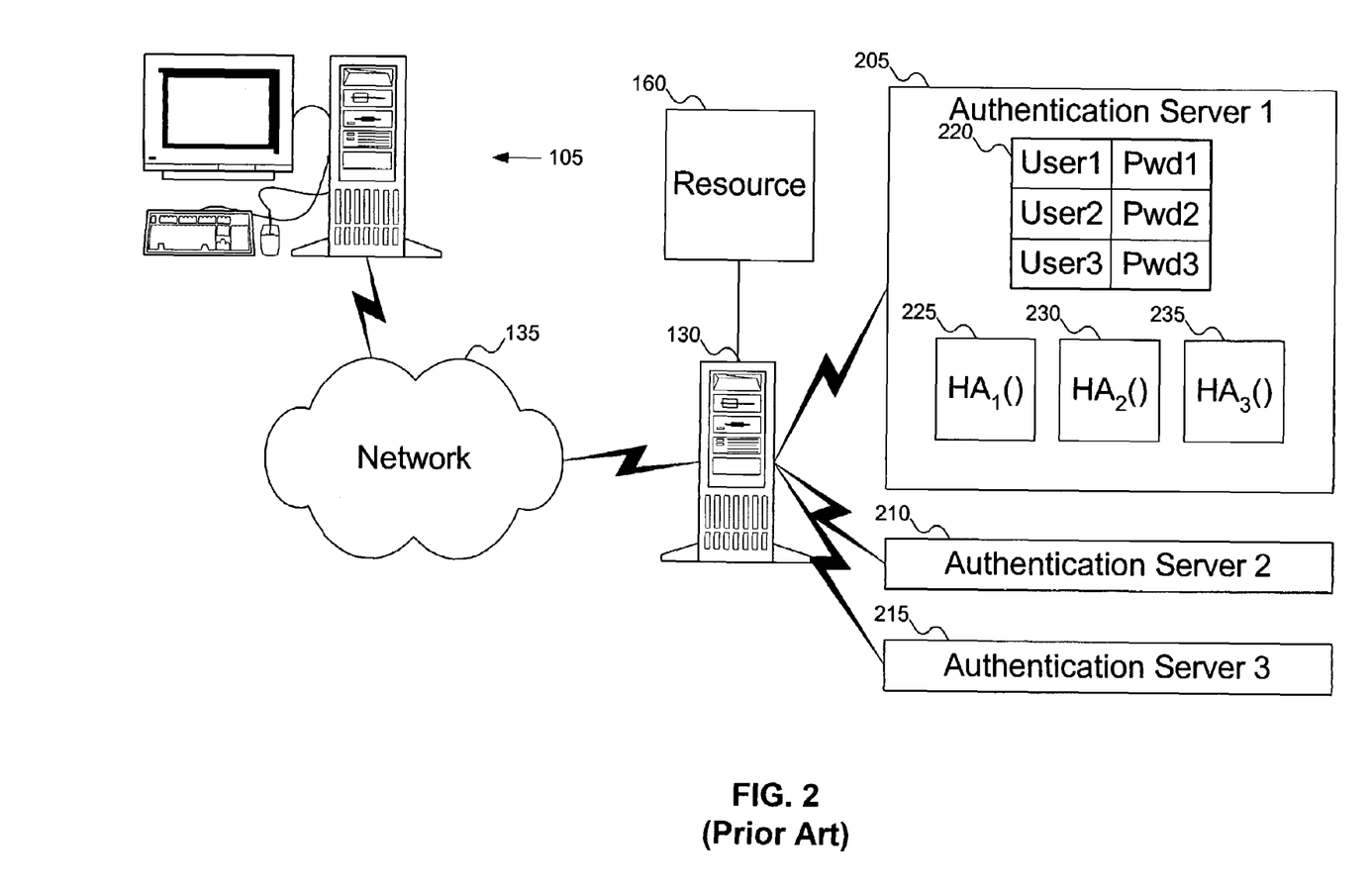
FIG. 2 shows a prior art system for authenticating a user using an application server and an authentication server.

One variation of this approach separates the responsibility for authentication from the responsibility for storing the resources. This situation is exemplified in FIG. 2. In FIG. 2, the user contacts application server 130 from client 105. But rather than having application server 130 be responsible for authenticating the user, application server 130 instead passes the responsibility for authenticating the user to an authentication server, such as one of authentication servers 205, 210, or 215. (Application server typically selects the appropriate authentication server to contact based on the resource the user is attempting to access.) Using authentication server 205 as an example, the authentication server includes user list 220 and implementations of hashing algorithms 225, 230, and 235 (which correspond to the implementations of hashing algorithms 145, 150, and 155 of FIG. 1). Authentication servers 210 and 215 are configured similarly. Authentication server 205 looks up the user's cleartext password based on the user's name, hashes it, and compares the hashed passwords to authenticate the user. Authentication server 205 then returns the result to application server 130, which then grants or denies the user access to resource 160, depending on whether the authentication succeeded or not.

While moving authentication away from the application server has its advantages, in that it compartmentalizes responsibility, it has drawbacks. One drawback is that if authentication server 205 is unavailable, application server 130 cannot grant the user access to the resources, even if application server 130 is available. Techniques to address this problem are described in related U.S. patent application Ser. No. 10/061,911, titled "Authentication Cache in a Distributed Network Environment," filed Feb. 1, 2002, and to U.S. patent application Ser. No. 10/061,895, titled "Authentication on Demand in a Distributed Network Environment," filed Feb. 1, 2002.

Another problem is that each authentication server has to know all the possible hashing algorithms that might be used by the client. If a new client becomes available that uses a new hashing algorithm, that hashing algorithm has to be implemented and installed in each of the authentication servers 205, 210, and 215. This has to be done manually: there is no mechanism for automating the development of the hashing algorithm. And it is usually not possible to implement the hashing algorithm only once and install it in each authentication server: Each authentication server typically has a distinct hardware/software environment, requiring specialized effort to implement the hashing algorithm in the environments. As the number of different hashing algorithms grows, it becomes increasingly complex to ensure that each authentication server has a proper implementation of each hashing algorithm: the number of implementations increases exponentially.

Accordingly, a need remains for a way to perform authentication using an authentication server, yet avoiding the exponential complexity in implementing hashing algorithms for each authentication server, to address these and other problems associated with the prior art.

SUMMARY OF THE INVENTION

The invention is a method and apparatus for performing authentication. An application server includes a user list, which has a user name and an associated cleartext password. The application server can authenticate the cleartext password to a cleartext password stored on an authentication server. The application server can hash the cleartext password, compare it with a hashed password received from a user workstation, and transmit a result back to the workstation.

The foregoing and other features, objects, and advantages of the invention will become more readily apparent from the following detailed description, which proceeds with reference to the accompanying drawings.

DETAILED DESCRIPTION OF THE PREFERRED EMBODIMENT

To avoid having to install a large number of hashing algorithm implementations in the authentication servers, embodiments of the invention use the authentication servers to verify that the cleartext password on the application server is correct, but let the application server calculate the hash of the cleartext password. In these embodiments, only one implementation of the hashing algorithm is required: for the application server. But authentication is still shifted to the authentication server, as the application server cannot know whether it has the correct cleartext password to use in the hash. For clarity, the process performed by the authentication server (verification that the cleartext password stored on the application server is correct) is called password authentication; the process performed by the application server (verification that the hashed password received from the client matches a hash of the cleartext password) is called user authentication. Where these terms are not used, context should make clear whether the password or the user is being authenticated.

Figure 3:
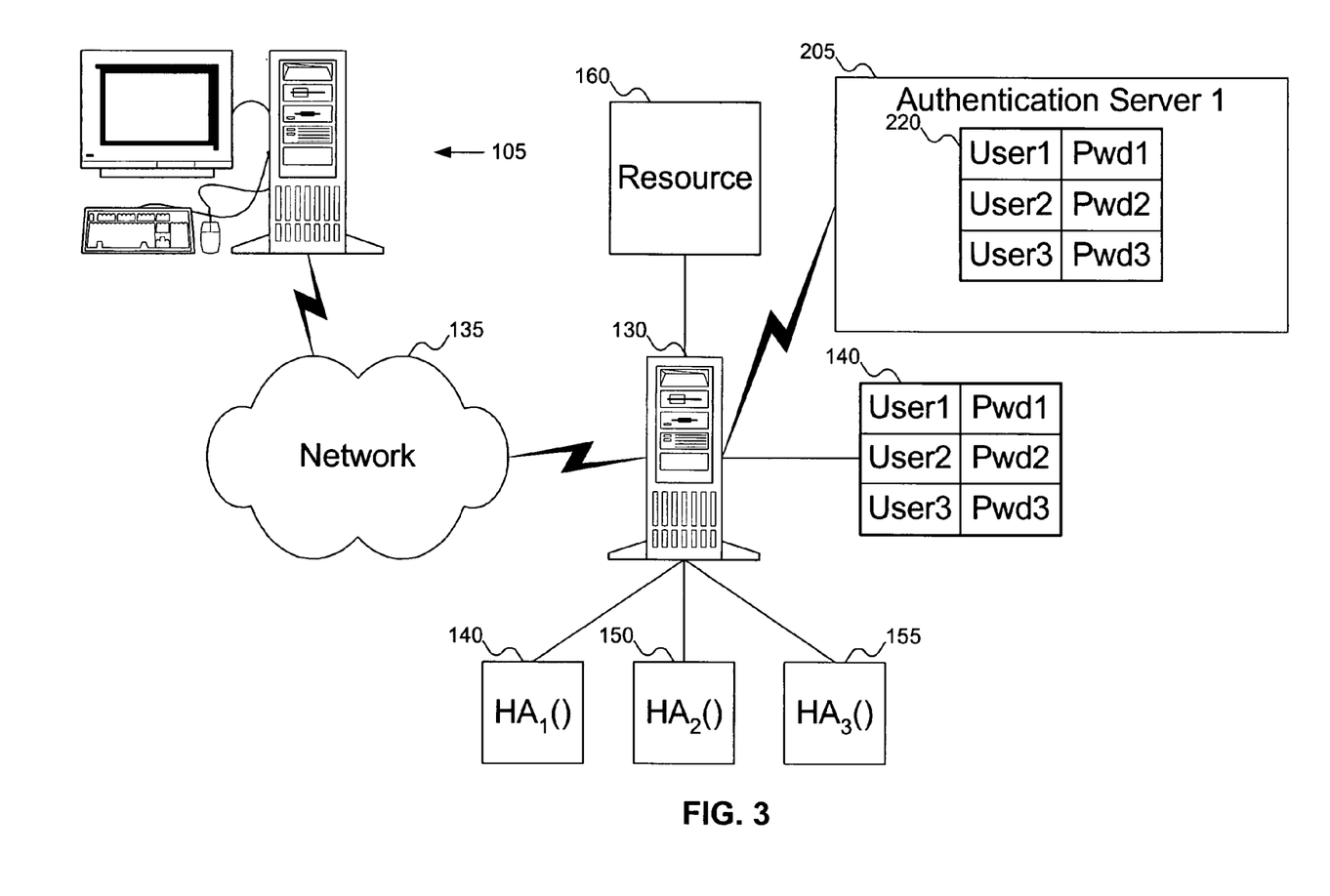
FIG. 3 shows a system with an authentication server configured to authenticate a cleartext password and an application server configured to verify a user's hashed password, according to an embodiment of the invention.

In FIG. 3, client 105 (also referred to as a workstation) communicates with application server 130 over network 135. Examples of possible configurations for client 105 include, among others, computers running Windows® XP, computers running Windows® 98 with a NetWare® client, and a Mac® computer. (Windows is either a registered trademark or a trademark of Microsoft Corporation in the United States and/or other countries; NetWare is a registered trademark of Novell, Inc. in the United States and other countries; Mac is a registered trademark of Apple Computer, Inc. in the U.S. and other countries.) An example of a possible configuration of application server 130, without being limited to this configuration, is a NetWare 6.5 server with Native File Access, such as NetWare Core Protocol (NCP), CIFS, and AppleTalk® Filing Protocol (AFP), among others. (AppleTalk is a registered trademark of Apple Computer, Inc. in the U.S. and other countries.)

As before, client 105 provides application server 130 with the user's name (also referred to as a user identifier, user identification, or logon identification, among other terms) and a hashed form of the user's password. Client 105 can use any hashing algorithm desired. Often, there is only one hashing algorithm installed on client 105, but a person skilled in the art will recognize that client 105 can have more than one installed hashing algorithm. If there is more than one hashing algorithm installed in client 105, client 105 can use any available hashing algorithm.

Application server 130 then looks up the cleartext password associated with the user name in user list 140. Application server 130 provides the user name and the cleartext password to authentication server 205 over a secure channel, in an attempt to perform password authentication. The password authentication operation can be done using any desired protocol. For example, the Lightweight Directory Access Protocol (LDAP) bind operation can be used to authenticate the cleartext password.

Authentication server 205 uses the user name to access user list 220, to determine the password associated with the user name. Authentication server 205 then compares the accessed cleartext password with the cleartext password provided by application server 130. If the cleartext passwords match, the password authentication attempt succeeds; if not, the password authentication attempt fails.

If the password authentication attempt fails, then application server 130 returns to workstation 105 the failure to authenticate. Typically, application server 130 does not indicate the reason for the failure; application server 130 simply indicates a failure. But a person skilled in the art will recognize that application server 130 can indicate that the problem was a mismatched password, alerting the user to the possibility that his password, as stored in user list 140 on application server 130, is out of date.

If the password authentication attempt operation succeeds, application server 130 then attempts to validate the user's password, thereby completing the user authentication process. Application server 130 determines which hashing algorithm(s) client 105 might have used, and uses each in turn to hash the cleartext password retrieved from user list 140. Some possible hashing algorithms, without providing a complete list, include: Common Internet File System/Server Message Block (CIFS/SMB) Message Digest 4 (MD4), Diffie Hellman, and Secure Hash Algorithm 1 (SHA1). After hashing the cleartext password using each hashing algorithm in turn, application server 130 compares the hashed passwords. If the hashed passwords match (using any of the hashing algorithms associated with client 105), then the user authentication is complete, and the user can be granted access to resource 160. Otherwise, the user authentication fails, and the user is denied access.

FIG. 3 describes application server 130 and authentication server 205 communicating cleartext versions of the user's password. As mentioned above, this interchange implies a secure connection between application server 130 and authentication server 205. If both servers are located in physically secure locations and the connection between them can be protected, then they can communicate without encrypting shared data. But a person skilled in the art will recognize that application server 130 and authentication server 205 can communicate using more secure means. For example, application server 130 and authentication server 205 can communicate using Secure Sockets Layer (SSL). Or, application server 130 can hash the cleartext version of the user's password, and only communicate the hashed version to authentication server 205. Assuming that authentication server 205 uses the same hashing algorithm as that used by application server 130, authentication server 205 can authenticate the user's password on application server 130 without the cleartext password being exposed to possible interception. Or, application server 130 and authentication server 205 can use some sort of encryption, so that application server 130 can encrypt the user's password and authentication server 205 can decrypt it, before the password authentication operation is completed.

One point that has not yet been discussed is how the various user lists are established. Initially, the entries in user list 220, stored in authentication server 205, are typically created by an administrator: if everyone could create accounts for themselves, then security would be very weak. But a person skilled in the art will recognize that user list 220 can be populated in other ways. For example, the administrator might create a master list of users and initial passwords elsewhere, and entries are populated in user list 220 as needed.

The administrator typically does not populate user list 140, stored in application server 130. Instead, user list 140 is populated from other sources. As described in related U.S. patent application Ser. No. 10/061,911, titled "Authentication Cache in a Distributed Network Environment," filed Feb. 1, 2002, and related U.S. patent application Ser. No. 10/061,895, titled "Authentication on Demand in a Distributed Network Environment," filed Feb. 1, 2002, application server 130 can request information for user list 140 from authentication server 205. In this embodiment, the cleartext password can be received from authentication server 205 via a secure communications channel, or by some form of encryption, so that the cleartext password is protected from interception. Another possibility is that when the user first logs in to application server 130, application server 130 prompts the user for a cleartext version of his password. (Again, the cleartext password preferably is sent initially from client 105 to application server 130 using a secure connection or encrypted, to prevent possible interception by a third party.) Application server 130 can then attempt to password authenticate the version of the password provided by the user.

Figure 4:
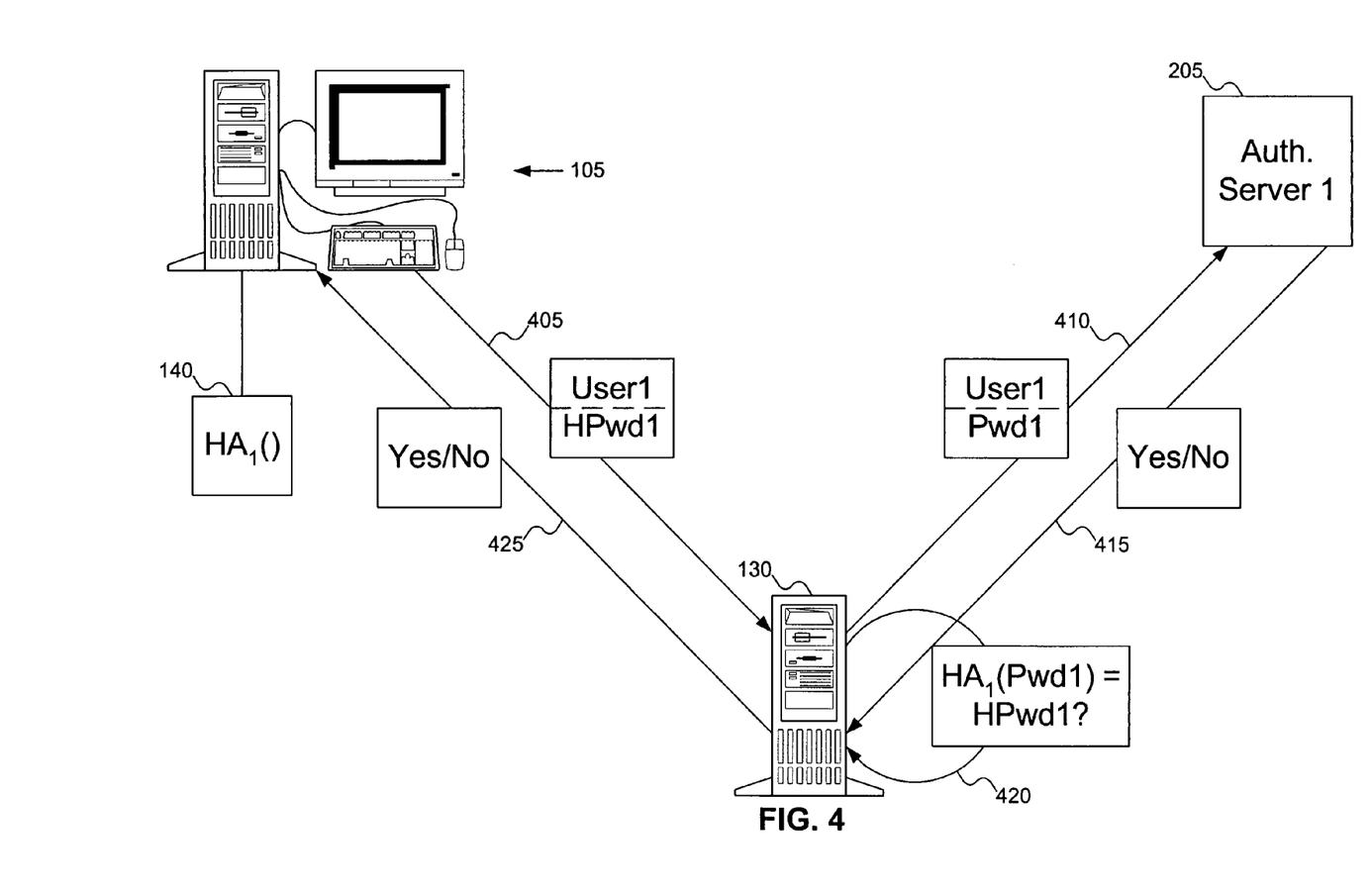
FIG. 4 shows the information transmitted among the workstation, application server, and authentication server of FIG. 3, according to an embodiment of the invention.

FIG. 4 shows the information transmitted among the workstation, application server, and authentication server of FIG. 3, according to an embodiment of the invention. Message 405 is the first message, sent from client 105 to application server 130. Message 405 includes the user name (User1), and the password as hashed (HPwd1) by client 105. Upon receipt of message 405, application server 130 determines the cleartext password associated with the user name within the user list stored on application server 130. Application server 130 then sends the user name (User1) and the associated cleartext password (Pwd1) to authentication server 205, as shown by message 410. As discussed above, because the cleartext password is being communicated, a secure communications channel, encryption, or some other way to protect the cleartext password from interception should be used. Authentication server 205 returns message 415, which indicates (Yes/No) whether the cleartext password associated with the user name within the user list stored on authentication server 205 matches the cleartext password provided by application server 130. Assuming the password authentication operation succeeds, then application server 130 compares the hashed version of the cleartext password with the hashed password provided by client 105 (shown as "message" 420). Finally, application server 130 responds with message 425, indicating (Yes/No) whether the user was authenticated.

Figure 5:
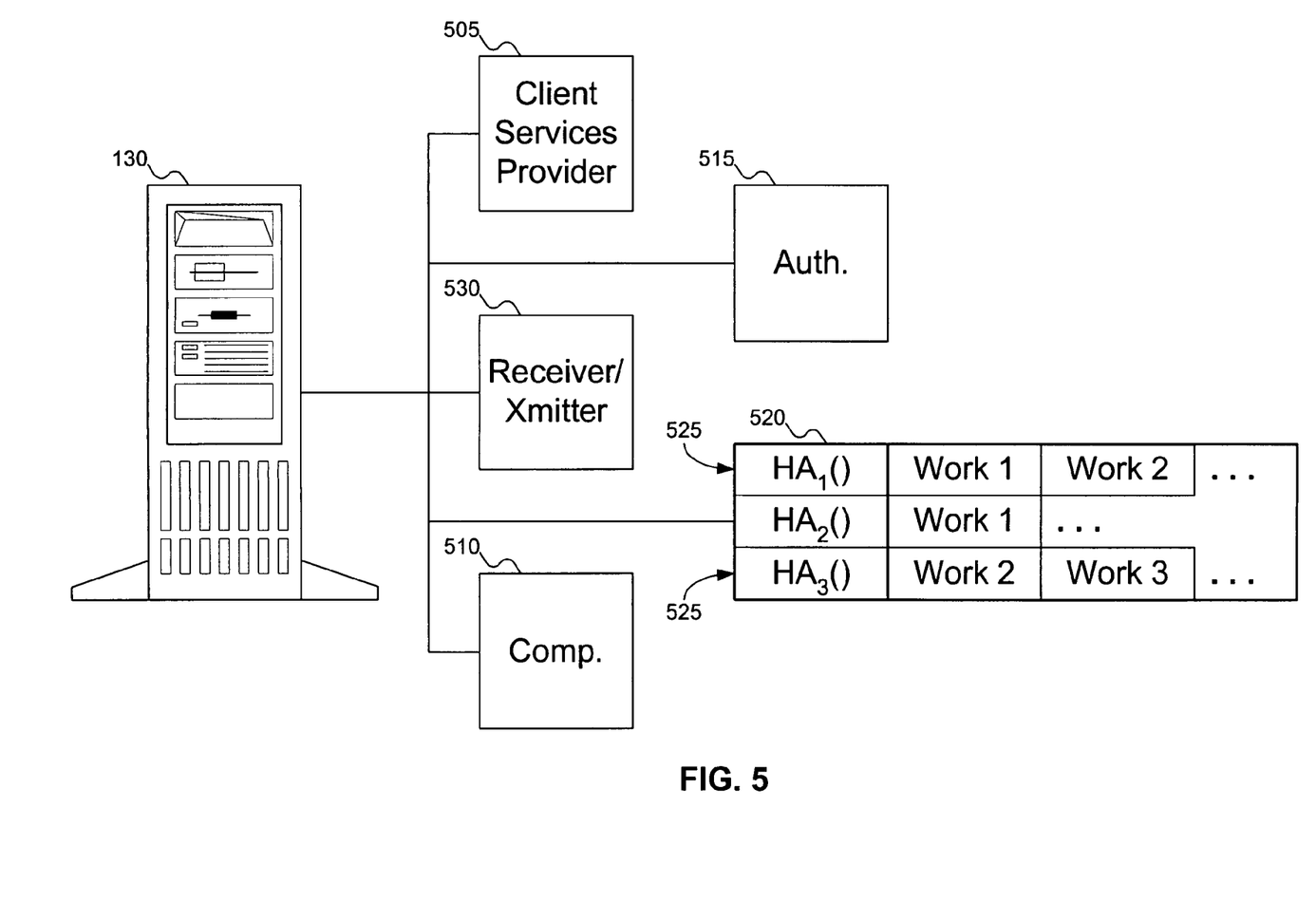
FIG. 5 shows details of the application server of FIG. 3, according to an embodiment of the invention.

FIG. 5 shows details of the application server of FIG. 3, configured (in software, firmware, hardware, or some combination thereof) to operate according to an embodiment of the invention. Application server 130 includes client services provider 505, comparator 510, authenticator 515, and table 520. Client services provider 505 operates as an interface for the client. Client services provider 505 receives the user name/hashed password from the workstation and forwards the user name to authenticator 515. Authenticator 515 uses the user name to retrieve the cleartext password from the user list. Authenticator 515 then forwards to the authentication server the user name/cleartext password. As discussed above, the cleartext password is preferably forwarded using a secure communications channel, in an encrypted form, or in some other way protected from interception. Authenticator 515 receives the result of the password authentication from the authentication server (discussed above).

If the cleartext password is authenticated, client services provider 505 then hashes the cleartext password using hashing algorithms associated with the client. Client services provider 505 uses table 520, which stores a list of which hashing algorithms can be used by which workstations. As discussed above with reference to FIG. 3, a client computer system might have more than one installed hashing algorithm. Table 520 lists each hashing algorithm, along with all the workstations using that algorithm. For example, according to entry 525, hashing algorithm $HA_1$ is used by workstations 1 and 2, whereas hashing algorithm $HA_3$ is used by workstations 2 and 3. Although table 520 shows which workstations are associated with which hashing algorithms, a person skilled in the art will recognize that there are other ways in which to organize this information. For example, table 520 could sort the data by workstations, listing which hashing algorithms are used by specific workstations. Or, each workstation could be an object in a container hierarchy, with the associated hashing algorithms being properties of the object.

Once client services provider 505 has hashed the cleartext password, client services provider 505 forwards the hashed cleartext password and the hashed password received from the workstation to comparator 510. Comparator 510 returns the result of the comparison. If comparator 510 indicates that the two hashed passwords matched, client services provider 505 returns to the client that the user is authenticated. Otherwise, client services provider 505 checks to see if there is another hashing algorithm associated with the client in table 520 to try. If there is another hashing algorithm to try, client services provider 505 hashes the cleartext password with the next hashing algorithm, and forwards the new hashed cleartext password and the received hashed password to comparator 510 for another comparison. The process repeats until comparator 510 indicates a successful comparison (in which case the user is authenticated) or until there are no more hashing algorithms to try (in which case the user is not authenticated).

As client services provider 505 and authenticator 515 both communicate with other machines, they both use receiver/transmitter 530. Receiver transmitter 530 is responsible for transmitting and receiving communications on behalf of application server 130 (and any processes or components within application server 130).

Figure 6:
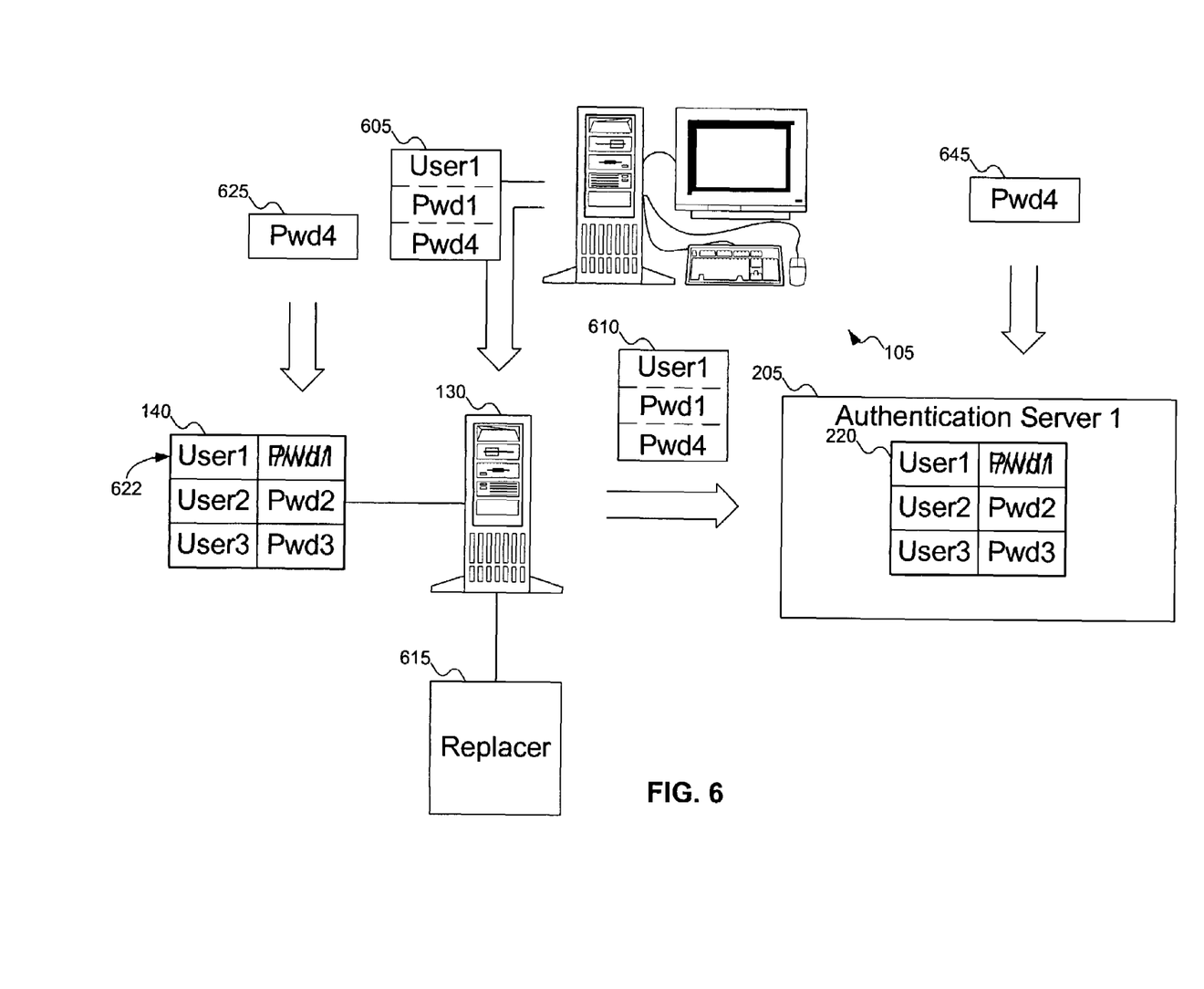
FIG. 6 shows the application server of FIG. 3 updating a cleartext password in the user list, according to an embodiment of the invention.

FIG. 6 shows the application server 130 of FIG. 3 updating a cleartext password in the user list, according to an embodiment of the invention. Good security procedures militate against keeping the same password for extended periods of time, meaning that the user should intermittently change his password. In FIG. 6, the user attempts to log in to authentication server 205 through application server 130. The user provides his user name, current password, and new password, as shown by message 605. Because the current and new passwords are sent as cleartext, message 605 is sent in a secure manner: for example, via a secure communications channel, or as an encrypted message. Application server 130 forwards this message to authentication server 205, as shown by message 610. Again, because cleartext passwords are being sent, message 610 is also secured. Authentication server 205 authenticates the user's current password by comparing the password associated with the user name in user list 220 to the provided current password. Assuming the current password is authenticated, authentication server 205 then replaces the current password with the new password, as shown. And once authentication server 205 returns to application server 130 an indication that the user has been authenticated, replacer 615 replaces the current password with the new password in user list 140 on application server 130.

Although FIG. 6 shows the password being changed on both authentication server 205 and application server 130 at roughly the same time, a person skilled in the art will recognize that this is not required. For example, the user can use an administrative tool to change the password directly on authentication server 205, without going through application server 130. Then, when the user attempts to access resources on application server 130, the user can change the current password on application server 130. But the approach shown in FIG. 6 only has the user providing the new password once, simplifying the procedure.

Figure 7A:
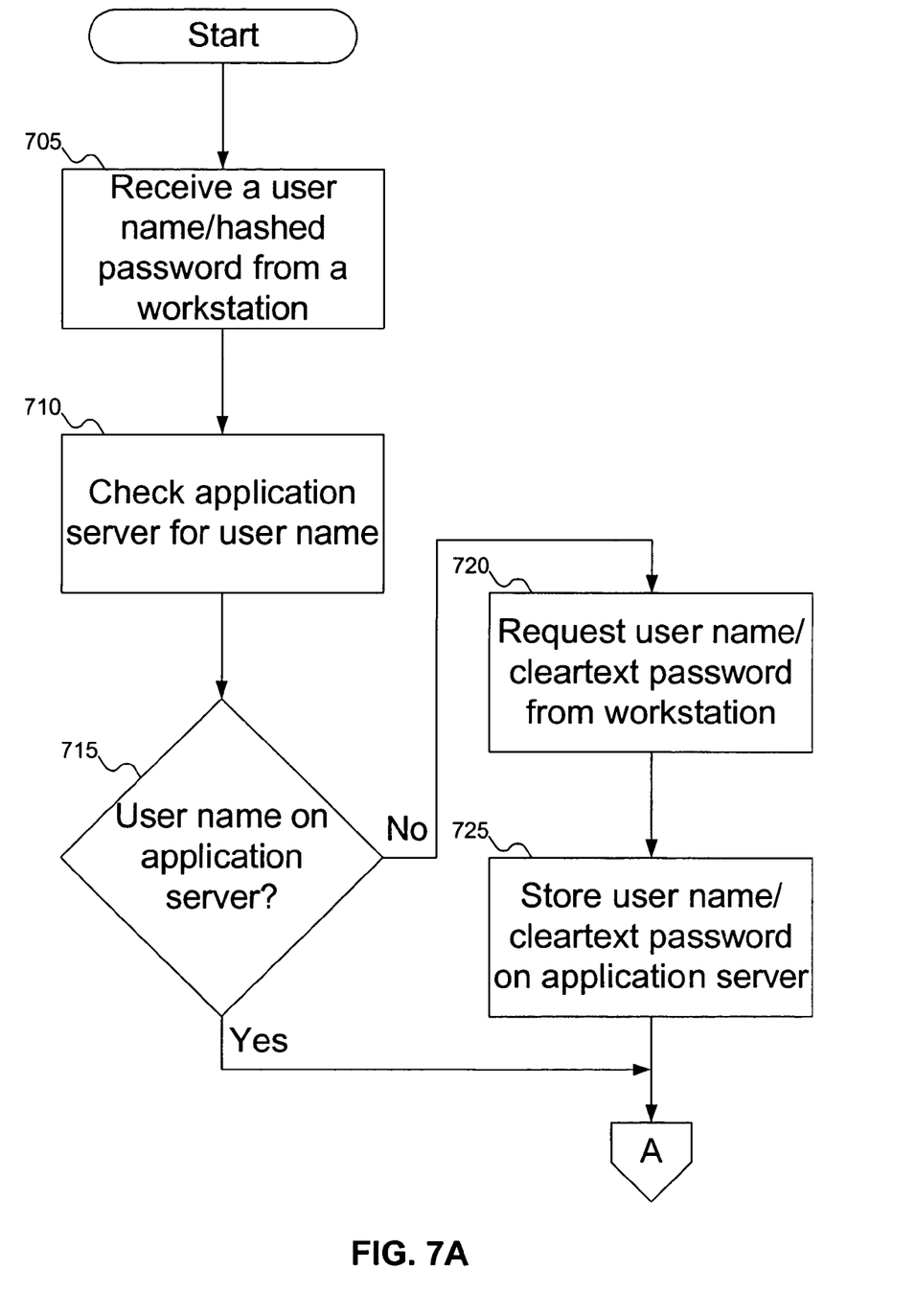
FIGS. 7A-7C show a flowchart of the procedure for authenticating a user using the system of FIG. 3, according to an embodiment of the invention.
Figure 7B:
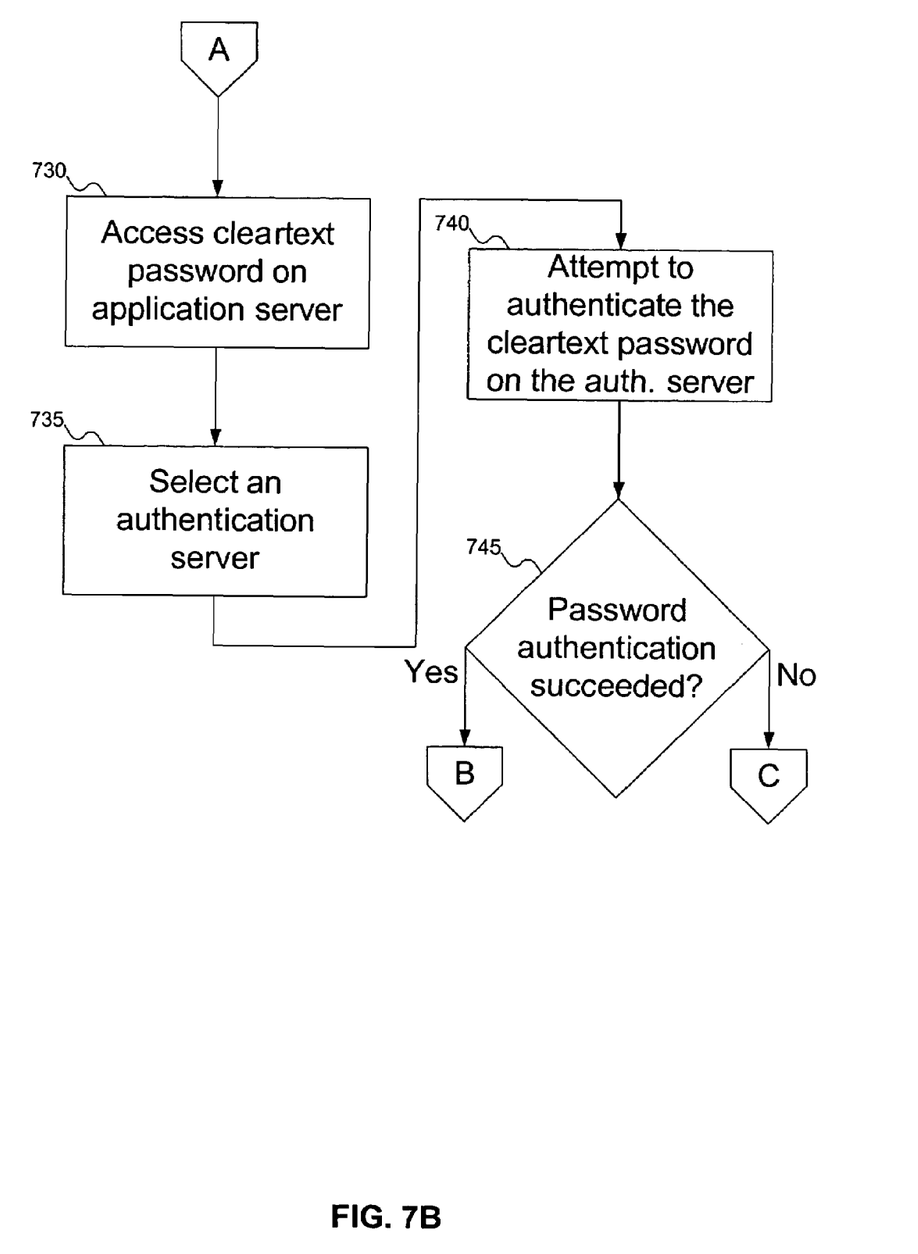
Figure 7C:
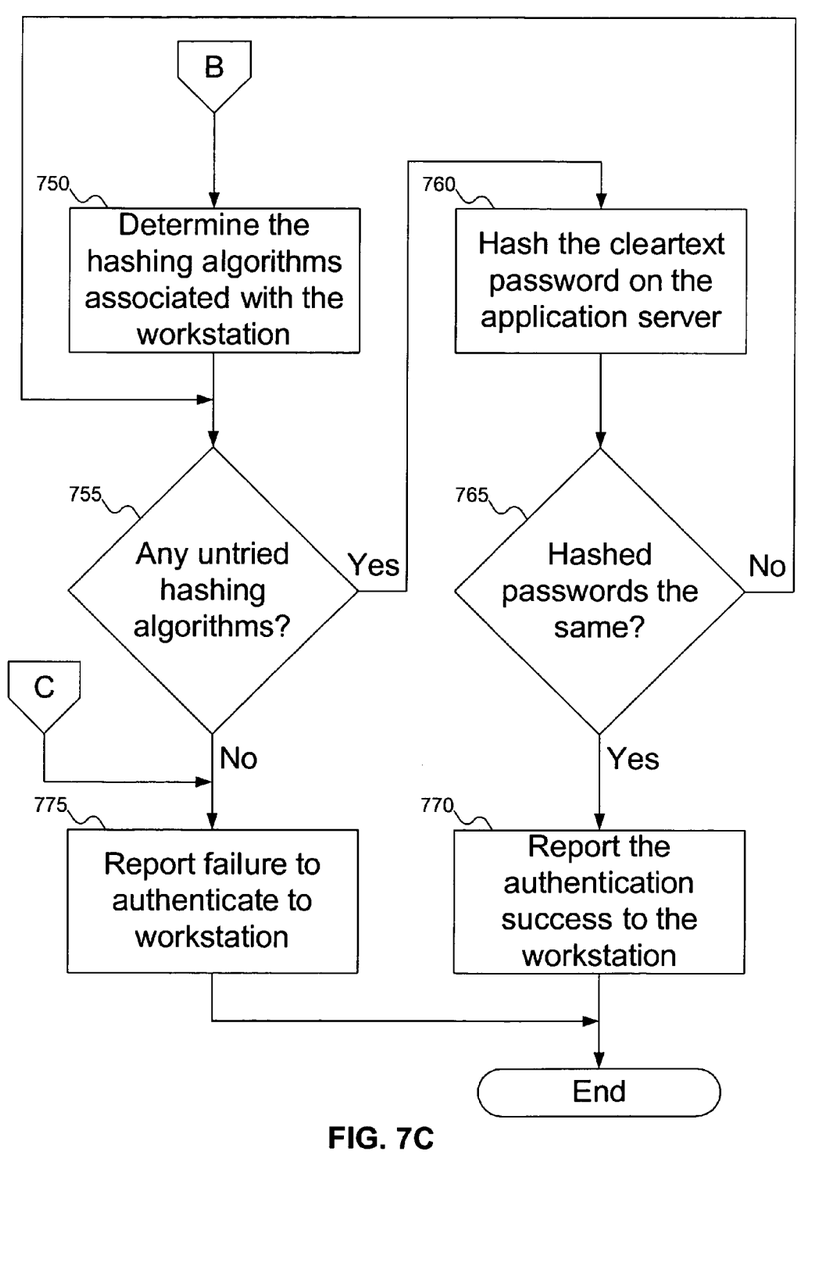

FIGS. 7A-7C show a flowchart of the procedure for authenticating a user using the system of FIG. 3, according to an embodiment of the invention. In FIG. 7A, at step 705, the application server 130 receives from the workstation 105 a user name and a hashed password. At step 710, the application server accesses the user list 140. At step 715, the application server checks to see if the user name is in the user list. If not, then at step 720, the application server requests from the user a cleartext version of the password, which is stored in the user list at step 725. Typically, as discussed above with reference to FIG. 3, the cleartext version of the password is received from the user via a secure channel.

Once the user name is found in the user list, at step 730 (FIG. 7B) the application server accesses the associated cleartext password. At step 735, the application server selects an authentication server. At step 740, the application server attempts to authenticate the password using the selected authentication server. At step 745, the application server determines whether the password authentication operation succeeded.

If the password authentication operation succeeded, then at step 750 (FIG. 7C), the application server determines the hashing algorithm(s) associated with the workstation. At step 755, the application server checks to see if there are any untried hashing algorithms associated with the workstation. If so, then at step 760, the application server selects one of the untried hashing algorithms and hashes the cleartext version of the password with the selected hashing algorithm. At step 765, the application server compares the hashed passwords to see if they match. If so, then at step 770, the application server 130 reports to the workstation 105 that the user authentication succeeded. Otherwise, processing returns to step 755 to see if there are any other hashing algorithms to try. Finally, if no hashing algorithm provides a matched hash of the password, or if the authentication server failed to authenticate the password (back at step 745 of FIG. 7B), then at step 775, the application server reports the failure to authenticate the user back to the workstation.

Figure 8:
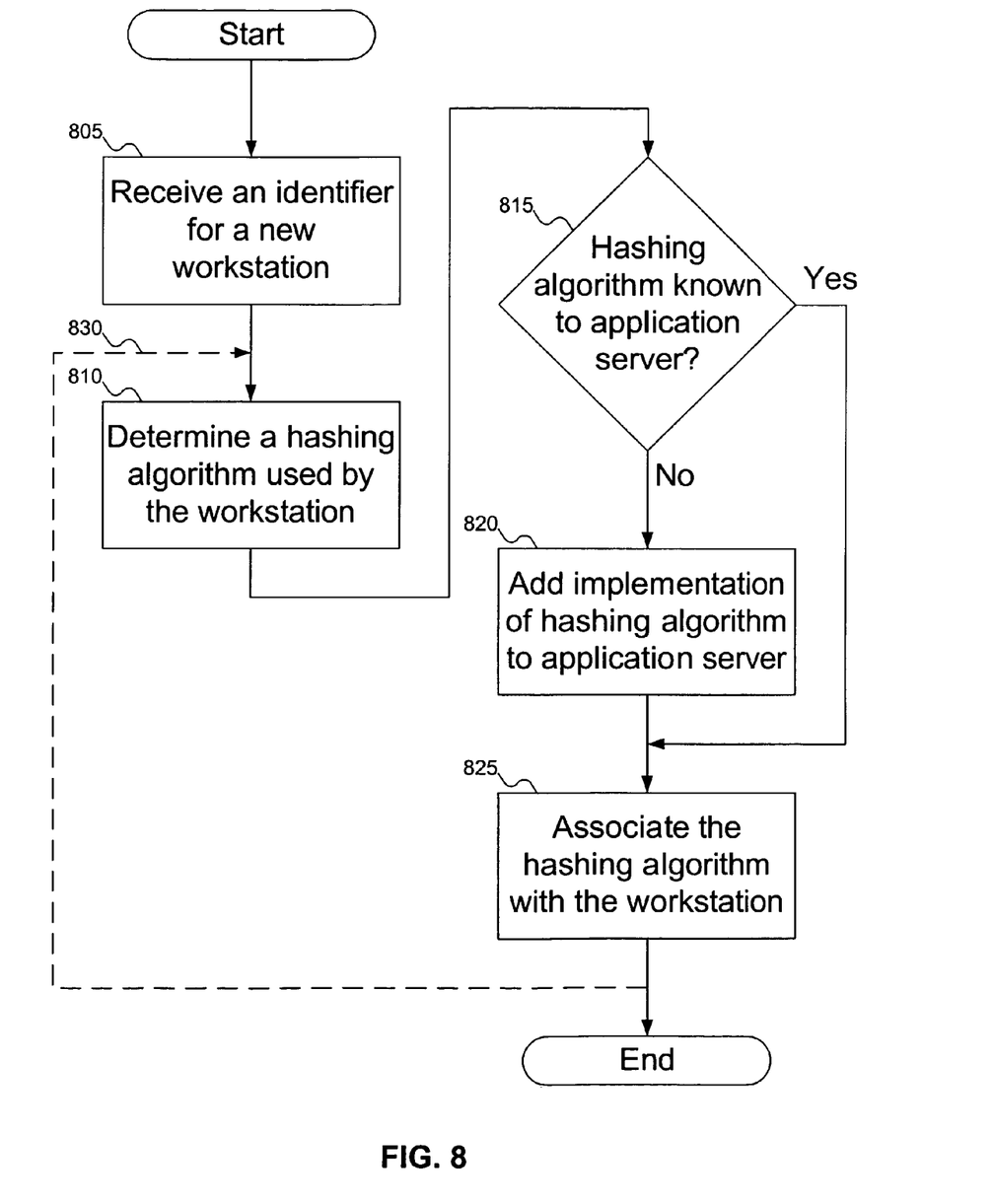
FIG. 8 shows a flowchart of the procedure for supporting authentication from a new workstation in the system of FIG. 3, according to an embodiment of the invention.

FIG. 8 shows a flowchart of the procedure for supporting authentication from a new workstation in the system of FIG. 3, according to an embodiment of the invention. At step 805, the application server 130 receives an identifier for a new workstation. At step 810, the application server determines a hashing algorithm used by the new workstation. At step 815, the application server checks to see if it has an implementation of the hashing algorithm. If not, then at step 820, an implementation of the hashing algorithm is added to the application server. Finally, at step 825, the new workstation is associated with the hashing algorithm.

As discussed above with reference to FIG. 3, there might be more than one hashing algorithm implemented for a particular workstation. This possibility is supported by arrow 830, which supports repeating steps 810-825 for multiple hashing algorithms.

Figure 9A:
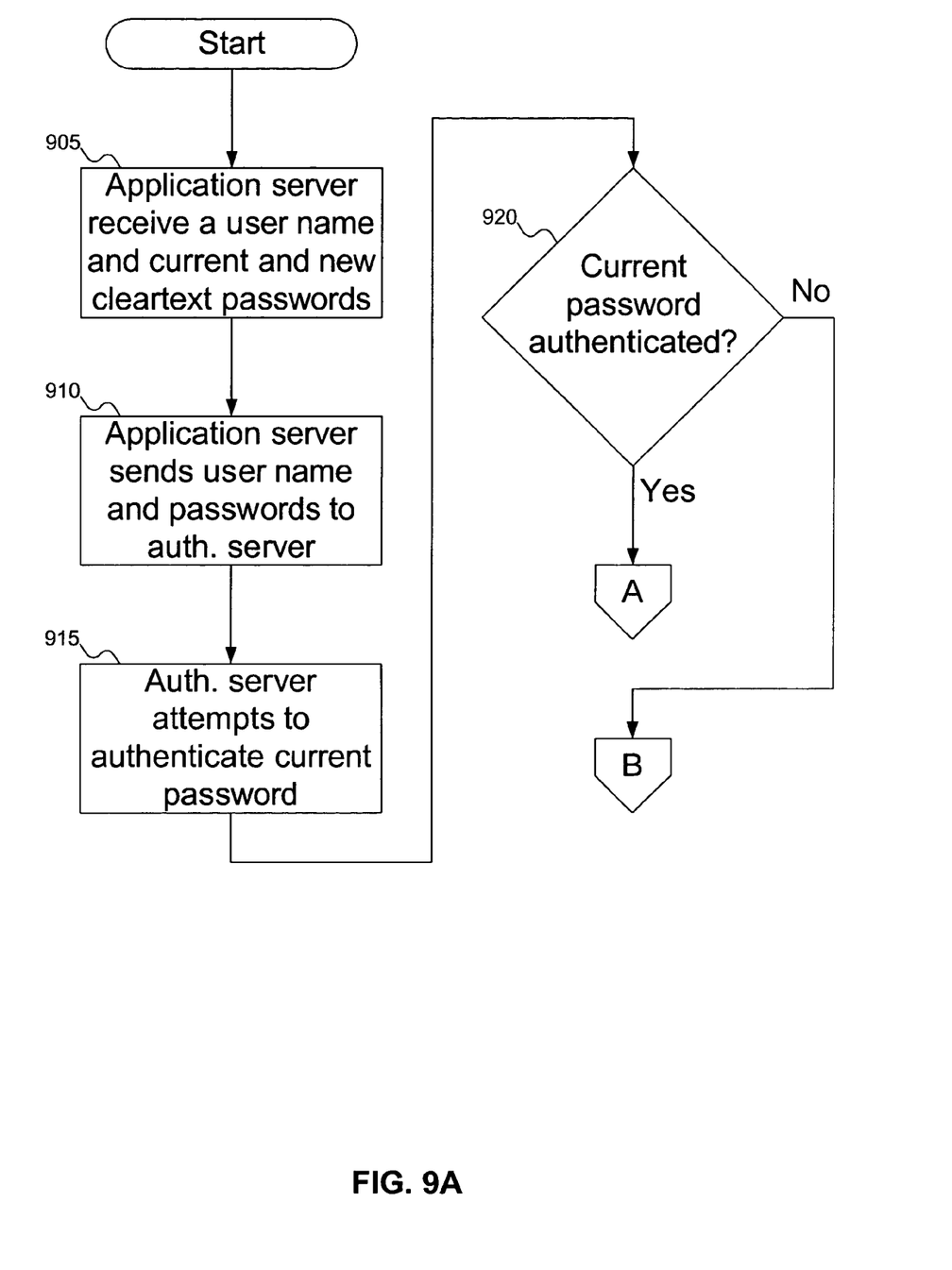
FIGS. 9A-9B show a flowchart of the procedure for updating the cleartext password used for authentication in the system of FIG. 3, according to an embodiment of the invention.
Figure 9B:
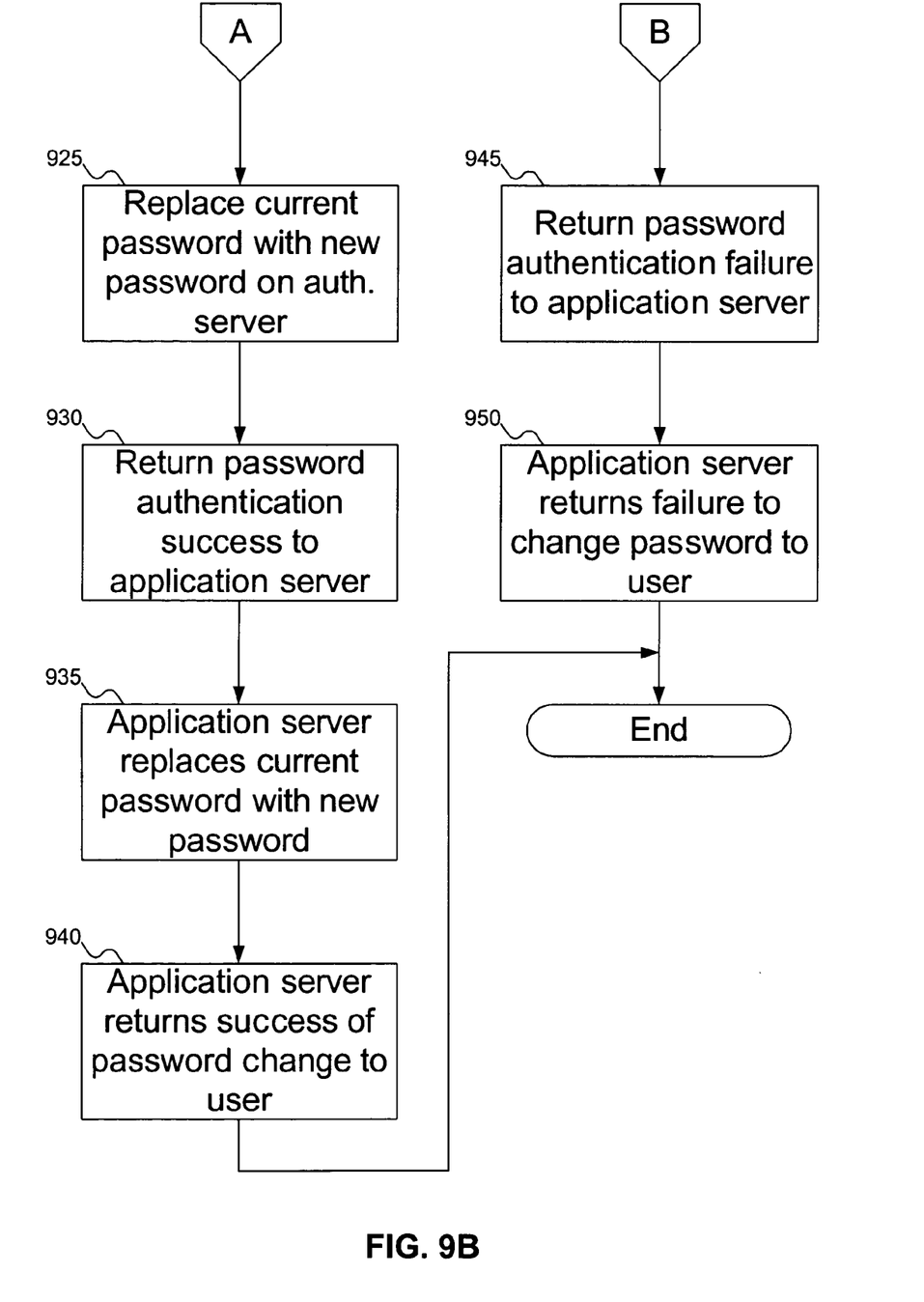

FIGS. 9A-9B show a flowchart of the procedure for updating the cleartext password used for authentication in the system of FIG. 3, according to an embodiment of the invention. In FIG. 9A, at step 905, the application server 130 receives a user name, a current password, and a new cleartext password from the workstation. At step 910, the application server sends this information to the authentication server. At step 915, the authentication server attempts to authenticate the current password (by comparing the received current password with the password associated with the user name in the user list). At step 920, the system checks to see if the password authentication operation succeeded.

If the password authentication operation succeeded, then at step 925 (FIG. 9B), the authentication server replaces the current password with the new password. At step 930, the authentication server reports to the application server that the current password was authenticated. At step 935, the application server replaces the current password with the new password in the application server's user list. Finally, at step 940, the application server reports to the user the success of the password change operation.

On the other hand, if the password authentication operation failed, then at step 945, the authentication server returns to the application server a failure to authenticate the password. In that case, at step 950, the application server reports to the user the failure to change the password.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An application server embodied in a computer, comprising:
    a user list, including a user name and a cleartext password associated with the user name;
    an authenticator to authenticate the cleartext password using an authentication server;
    a hasher to hash the cleartext password to produce a hashed password;
    a comparator to compare the hashed password with a received hashed password; and
    a client services provider to receive the received hashed password from a workstation and to transmit a result from the comparator to the workstation.

2. An application server according to claim 1, wherein the hasher includes a hashing algorithm associated with the workstation.

3. An application server according to claim 2, wherein the hasher includes a second hashing algorithm associated with a second workstation.

4. An application server according to claim 2, wherein hasher includes a second hashing algorithm associated with the workstation.

5. An application server according to claim 1, wherein the client services provider is operative to receive the cleartext password from the workstation.

6. An application server according to claim 1, wherein:
    the client services provider is operative to receive a new cleartext password from the workstation; and
    the application server further comprises a replacer to replace the cleartext password with the new cleartext password.

7. A system, comprising:
    a network;
    a workstation coupled to the network, the workstation including:
        a first user name and a first cleartext password; and
        a first hasher to hash the first cleartext password to produce a first hashed password;
    an authentication server coupled to the network, the authentication server including a second user name and a second cleartext password associated with the second user name; and
    an application server coupled to the network, the application server including:
        a user list including a third user name and a third cleartext password associated with the third user name;
        an authenticator to authenticate the third cleartext password to the second cleartext password using the authentication server;
        a second hasher to hash the third cleartext password to produce a second hashed password;
        a comparator to compare the first hashed password with the second hashed password; and
        a client services provider to receive the received hashed password from a workstation and to transmit a result from the comparator to the workstation.

8. A system according to claim 7, wherein:
    the first hasher includes a first hashing algorithm; and
    the second hasher includes the first hashing algorithm, the first hashing algorithm associated with the workstation.

9. A system according to claim 8, wherein the second hasher includes a second hashing algorithm associated with a second workstation.

10. A system according to claim 7, wherein:
the receiver is operative to receive a new cleartext password from the workstation; and
the application server further comprises a replacer to replace the cleartext password with the new cleartext password.

11. A system according to claim 10, wherein the transmitter is operative to forward the new cleartext password to the authentication server.

12. A method for authenticating a user on an application server, comprising:
receiving a user name and a hashed password from a first workstation;
determining a cleartext password associated with the user name;
authenticating the cleartext password to a second password using an authentication server;
determining a hashing algorithm used by the first workstation;
hashing the cleartext password using the hashing algorithm to produce a computed hashed password;
comparing the received hashed password with the computed hashed password; and
if the received hashed password matches the computed hashed password, authenticating the user.

13. A method according to claim 12, further comprising, if the received hashed password does not match the computed hashed password, failing to authenticating the user.

14. A method according to claim 12, further comprising selecting the authentication server from a plurality of authentication servers.

15. A method according to claim 12, wherein authenticating the cleartext password to a second password includes binding the cleartext password to the second password on the authentication server using a Lightweight Directory Access Protocol (LDAP).

16. A method according to claim 12, wherein determining a hashing algorithm used includes selecting the hashing algorithm from a plurality of hashing algorithms.

17. A method according to claim 16, further comprising adding a new hashing algorithm to the plurality of hashing algorithms.

18. A method according to claim 17, wherein adding a new hashing algorithm includes associating the hashing algorithm with at least one of a set of workstations, the set of workstations including the first workstation.

19. A method according to claim 12, wherein determining a cleartext password includes:
determining that the cleartext password does not exist on the application server:
requesting from the user the cleartext password; and
receiving from the user the cleartext password.

20. A method according to claim 12, further comprising:
receiving a request from the workstation to change the cleartext password to a new cleartext password; and
replacing the cleartext password with the new cleartext password.

21. A method according to claim 20, further comprising forwarding the new cleartext password to the authentication server.

22. An article comprising a machine-accessible medium having associated data, wherein the data, when accessed, results in a machine performing:
receiving a user name and a hashed password from a first workstation;
determining a cleartext password associated with the user name;
authenticating the cleartext password to a second password using an authentication server;
determining a hashing algorithm used by the first workstation;
hashing the cleartext password using the hashing algorithm to produce a computed hashed password;
comparing the received hashed password with the computed hashed password; and
if the received hashed password matches the computed hashed password, authenticating the user.

23. An article according to claim 22, the machine-accessible data further including associated data that, when accessed, results in, if the received hashed password does not match the computed hashed password, failing to authenticating the user.

24. An article according to claim 22, the machine-accessible data further including associated data that, when accessed, results in selecting the authentication server from a plurality of authentication servers.

25. An article according to claim 22, wherein authenticating the cleartext password to a second password includes binding the cleartext password to the second password on the authentication server using a Lightweight Directory Access Protocol (LDAP).

26. An article according to claim 22, wherein determining a hashing algorithm used includes selecting the hashing algorithm from a plurality of hashing algorithms.

27. An article according to claim 26, the machine-accessible data further including associated data that, when accessed, results in adding a new hashing algorithm to the plurality of hashing algorithms.

28. An article according to claim 27, wherein adding a new hashing algorithm includes associating the hashing algorithm with at least one of a set of workstations, the set of workstations including the first workstation.

29. An article according to claim 22, wherein determining a cleartext password includes:
determining that the cleartext password does not exist on the application server;
requesting from the user the cleartext password; and
receiving from the user the cleartext password.

30. An article according to claim 22, the machine-accessible data further including associated data that, when accessed, results in:
receiving a request from the workstation to change the cleartext password to a new cleartext password; and
replacing the cleartext password with the new cleartext password.

31. An article according to claim 30, the machine-accessible data further including associated data that, when accessed, results in forwarding the new cleartext password to the authentication server.

* * * * *